United States Patent
Krippner et al.

(10) Patent No.: US 7,925,386 B2
(45) Date of Patent: Apr. 12, 2011

(54) CONTROL DEVICE FOR A PNEUMATICALLY OPERATED ACTUATOR

(75) Inventors: Peter Krippner, Karlsruhe (DE); Thomas Kleegrewe, Minden (DE); Armin Gasch, Speyer (DE); Detlef Pape, Nussbaumen (DE); Wolfgang Lasarzik, Bad Nenndorf (DE); Wolfgang Scholz, Minden (DE); Urs E. Meier, Würenlingen (CH)

(73) Assignee: ABB AG, Mannheim (DE)

( * ) Notice: Subject to any disclaimer, the term of this patent is extended or adjusted under 35 U.S.C. 154(b) by 392 days.

(21) Appl. No.: 12/000,527

(22) Filed: Dec. 13, 2007

(65) Prior Publication Data
US 2008/0154436 A1 Jun. 26, 2008

(30) Foreign Application Priority Data
Dec. 21, 2006 (DE) .................... 10 2006 060 601

(51) Int. Cl.
*G05D 7/00* (2006.01)
(52) U.S. Cl. .................... 700/282; 702/183; 137/486
(58) Field of Classification Search .............. 700/282; 137/487.5; 73/1.72, 168
See application file for complete search history.

(56) References Cited

U.S. PATENT DOCUMENTS

| 5,573,032 | A   | * | 11/1996 | Lenz et al. ............... 137/486 |
| 6,196,369 | B1  | * | 3/2001  | Willert et al. ............ 192/85.53 |
| 6,382,226 | B1  | * | 5/2002  | Larson et al. ............... 137/1 |
| 6,745,084 | B2  | * | 6/2004  | Boger et al. ............... 700/13 |
| 6,789,458 | B2  | * | 9/2004  | Schumacher et al. ....... 91/363 R |
| 6,999,853 | B2  | * | 2/2006  | Junk et al. ............... 700/282 |
| 7,058,542 | B2  | * | 6/2006  | Hauhia et al. ............ 702/183 |
| 7,478,012 | B2  | * | 1/2009  | Tewes et al. ............. 702/183 |
| 7,621,293 | B2  | * | 11/2009 | Snowbarger ........... 137/487.5 |
| 7,676,287 | B2  | * | 3/2010  | Eryurek et al. ............ 700/83 |
| 2006/0092039 | A1 | * | 5/2006  | Saito et al. ............. 340/825.37 |
| 2006/0272710 | A1 | * | 12/2006 | Minervini et al. ........ 137/487.5 |

* cited by examiner

Primary Examiner — Albert Decady
Assistant Examiner — Dave Robertson
(74) Attorney, Agent, or Firm — Buchanan Ingersoll & Rooney PC

(57) ABSTRACT

The disclosure relates to a control device for a pneumatically operated actuator in the field of process automation, in particular for continuous control of material flows in the industrial environment. The control device has a communications interface for receiving an electrical setpoint value, and an output for the output of a pneumatic fluid, whose pressure is varied as a function of a control deviation. The received electrical setpoint value is suitable as a process parameter. The control device is connected via a communications channel to an actual-value encoder, which is designed to output an electrical signal corresponding to the actual value of the same process parameter.

7 Claims, 2 Drawing Sheets

CONTROL DEVICE FOR A PNEUMATICALLY OPERATED ACTUATOR

RELATED APPLICATION

This application claims priority under 35 U.S.C. §119 to German Patent Application No. 10 2006 060 601.9 filed in Germany on 21 Dec. 2006, the entire contents of which are hereby incorporated by reference in their entireties.

TECHNICAL FIELD

A control device for a pneumatically operated actuator in the field of process automation is disclosed, in particular for continuous control of material flows in the industrial environment via continuously operating pneumatic drives.

BACKGROUND INFORMATION

Continuously operating process valves are used for flow control in industrial processes, in particular in the chemical and petrochemical industry, and in power stations. Such process valves are mainly actuated via pneumatically operated actuators. Such actuators basically comprise a cylinder in which a piston is moved by the pneumatic fluid. This piston is coupled mechanically to the process valve. The pneumatic fluid exerts pressure on the cylinder by means of a positioner, as it is called.

Two types of actuators are known by prior public use. In the "single-acting" actuator, the pneumatic fluid exerts pressure on just one side of the piston by means of the positioner. A spring is provided to move the piston in the opposite direction. In the double-acting actuator, the pneumatic fluid exerts a pressure on both sides of the piston by means of the positioner. This means that it is possible to move the piston, and hence the process valve coupled to the piston, in both directions without mechanical return elements.

The positioner is provided with an electrical setpoint value for the valve position of the process valve via a communications interface. This communications interface may have a digital implementation as a fieldbus interface or an analog implementation as a 4.20 mA interface.

The actual value of the valve position is detected via a sensor element on the mechanical coupling between the actuator and the process valve. The positioner then controls at its output the pressure of the pneumatic fluid such that the valve position attains or retains the defined setpoint value.

Although in such a positioner the defined setpoint value of the valve position is attained quickly by controlling the valve position, in the automation engineering application, the actual position of the process valve is only of secondary importance. In contrast, process parameters such as the volume flow rate in a pipeline or the level in a vessel are far more relevant to the automation engineering application. In controlling the valve position, a higher-level controller than the positioner, located in the control system, must convert these process parameters into the setpoint value defined for the process valve, namely its valve position, and transfer it to the positioner. The crucial process parameter is adjusted with a corresponding time delay. In addition, it is deemed disadvantageous that a control system is needed, which defines the setpoint values for the positioner. Since the positioner has no information available on the real process parameter, monitoring functions can only be implemented by separate software modules in the control system.

In addition, fitting and calibrating the valve-position detection system is very time consuming. It requires a reference movement of the valve and hence intervention in the process.

SUMMARY

A control device for a pneumatically operated actuator is disclosed, which avoids the disadvantages of the known control device, and, in particular, enables the process setpoint value to be attained more quickly.

A control device for a pneumatically operated actuator for actuating a process valve is disclosed in order to control a material flow in a pipeline, said control device having a communications interface for receiving an electrical setpoint value, and varying at its output the pressure of the pneumatic fluid as a function of a control deviation, wherein the received electrical setpoint value is suitable as a process parameter, and the control device is connected via a communications channel to an actual-value encoder, which is designed to output an electrical signal corresponding to the actual value of the same process parameter.

BRIEF DESCRIPTION OF THE DRAWINGS

Further particulars and advantages of the disclosure are explained in greater detail below with reference to exemplary embodiments and the requisite drawings, in which.

DETAILED DESCRIPTION

The disclosure is based on a control device for a pneumatically operated actuator for actuating a process valve in order to control a material flow in a pipeline, said control device having a communications interface for receiving an electrical setpoint value, and varying at its output the pressure of the pneumatic fluid as a function of a control deviation.

According to the disclosure, the received electrical setpoint value is suitable as a process parameter, and is hence independent of a particular valve position of the process valve. The control device is connected via a communications channel to an actual-value encoder, which is designed to output an electrical signal corresponding to the actual value of the same process parameter.

The electrical signal of the actual value of the process parameter is advantageously available to the control device, for comparison with the defined setpoint value, immediately and directly after it is measured. The process valve thereby responds more quickly to control deviations of the process parameter.

In addition, installing and commissioning the actuator is simplified by the removal of the mechanical coupling between the valve drive and the control device. In particular, the time saved by not needing to calibrate the mechanical coupling results in a significantly lower commissioning effort.

Decoupling the valve drive from the control device also results in the control device having the versatility to be used with any actuators, because the travel of the process valve is no longer relevant to the choice of the control device.

Figure 1:
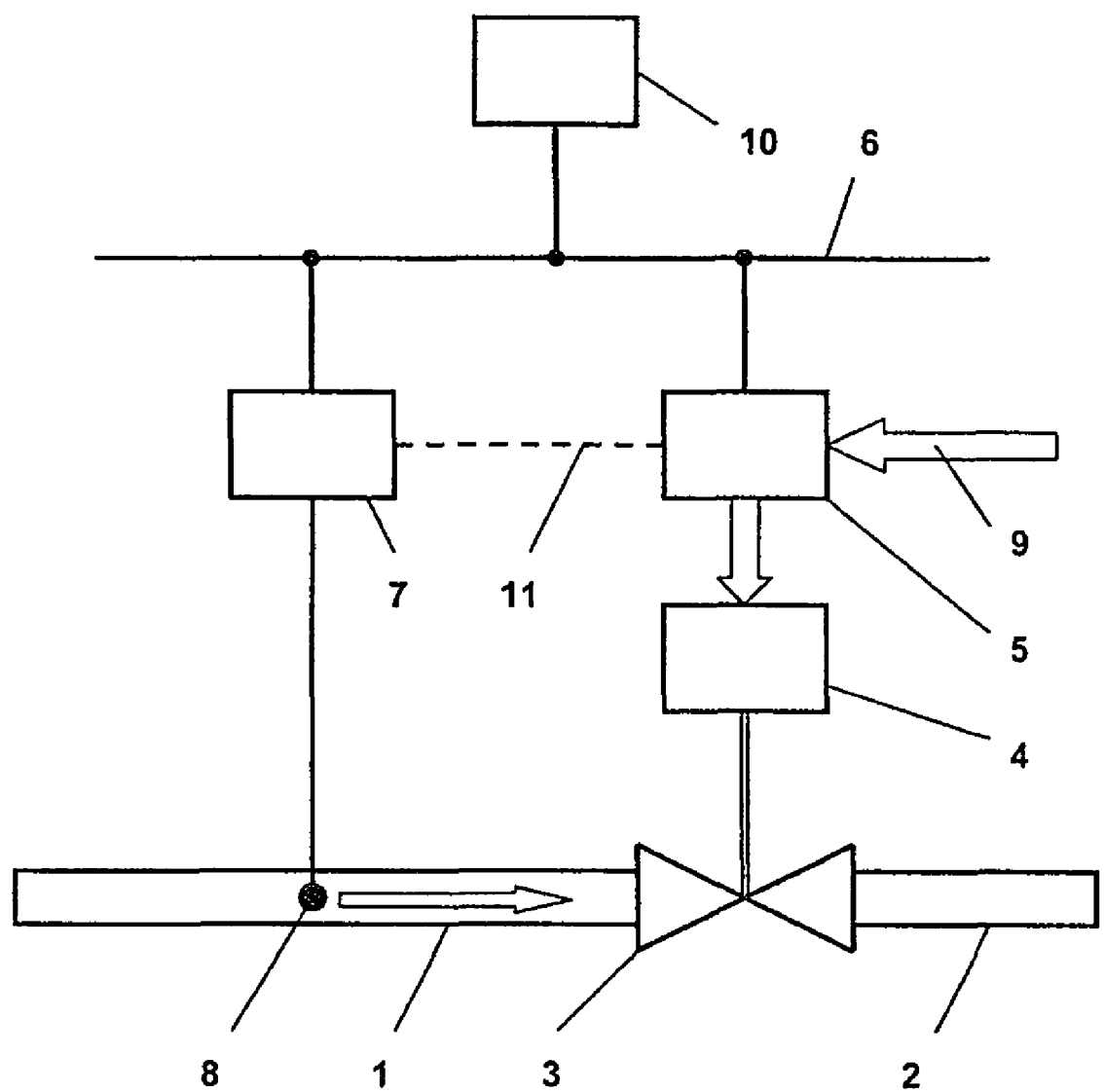
FIG. 1 shows a block diagram of an exemplary control circuit for controlling a process parameter.

FIG. 1 shows a block diagram of an exemplary control circuit for controlling a process parameter. Arranged between two containers 1 and 2 for holding process medium, which are shown in FIG. 1 as sections of pipeline, is a process valve 3 for allowing or blocking the flow of process medium between the containers 1 and 2. The process valve 3 is actuated by an actuator 4, which is controlled by a control device 5 as a function of a control deviation. A sensor 8 for the actual value of the process parameter is arranged in the container 1 and connected to an actual-value encoder 7.

It is assumed below that a flow rate is the process parameter to be controlled. It is within the scope of the disclosure, however, that the process parameter to be controlled is another process parameter of the fluid flow, such as a volume flow rate or a fluid level. Under the given assumption, the actual flow rate through the container 1 is measured and output by the sensor 8 in conjunction with the actual-value encoder 7.

In a first exemplary embodiment of the disclosure, the actual-value encoder 7 comprises a fieldbus interface, and is connected via this to a fieldbus 6.

The control device 5 and a control system 10 are also connected to the fieldbus. In this embodiment, the control system 10 defines a setpoint value for the process parameter to be controlled, i.e. a specific flow rate. The actual value of the process parameter to be controlled is transferred from the actual-value encoder 7 via the fieldbus 6 to the control device 5. In the control device 5, the control deviation is determined as the difference of the setpoint value and the actual value, and the actuator 4 is controlled in such a way that the actual value approaches the setpoint value.

In a second exemplary embodiment of the disclosure, a direct connection 11 is provided between the actual-value encoder 7 and the control device 5. In this embodiment, a setpoint value for the process parameter to be controlled, i.e. a specific flow rate, is defined by the control system 10, and passed to the control device 5 via the fieldbus 6. The actual value, on the other hand, is transferred directly to the control device 5 via the direct connection 11. The direct connection 11 can be implemented by a connecting cable between the actual-value encoder 7 and the control device 5.

Alternatively, a wireless connection between the actual-value encoder 7 and the control device 5 can be provided. A high-speed, standard wireless communications interface is preferably provided for this.

This advantageously reduces the amount of data to be transferred via the fieldbus 6, in other words it reduces the bus load. In particular, the maximum data rate is independent of the number of bus devices on the fieldbus 6. Particularly rapid control of the flow rate can thereby be achieved.

By this means, significantly faster data rates than are usual for bus communication can also be achieved, which, by transferring the raw values from the actual-value encoder 7, enable additional diagnostic functions in the control device 5. In a further embodiment of the disclosure, it can also be provided that the valve diagnostics are performed in the actual-value encoder 7, and only the result is transferred to the control device 5.

In addition, the actual-value encoder 7 can communicate with the control system 10 via the control device 5 without itself having a fieldbus interface.

It can also be provided, however, that the actual-value encoder 7 is also connected to the fieldbus 6 in parallel with the direct connection 11. This enables the transfer of diagnostic data and/or error messages between the actual-value encoder 7 and the control system 10.

The theory of the disclosure permits simple diagnostic functions even in this exemplary embodiment. For instance, leaks in the valve seating can be detected by it not being possible to control the flow down to the defined setpoint value of zero. Conversely, a fault in the drive system is detected as soon as the defined setpoint value cannot be attained despite the process valve 3 being fully open.

Figure 2:
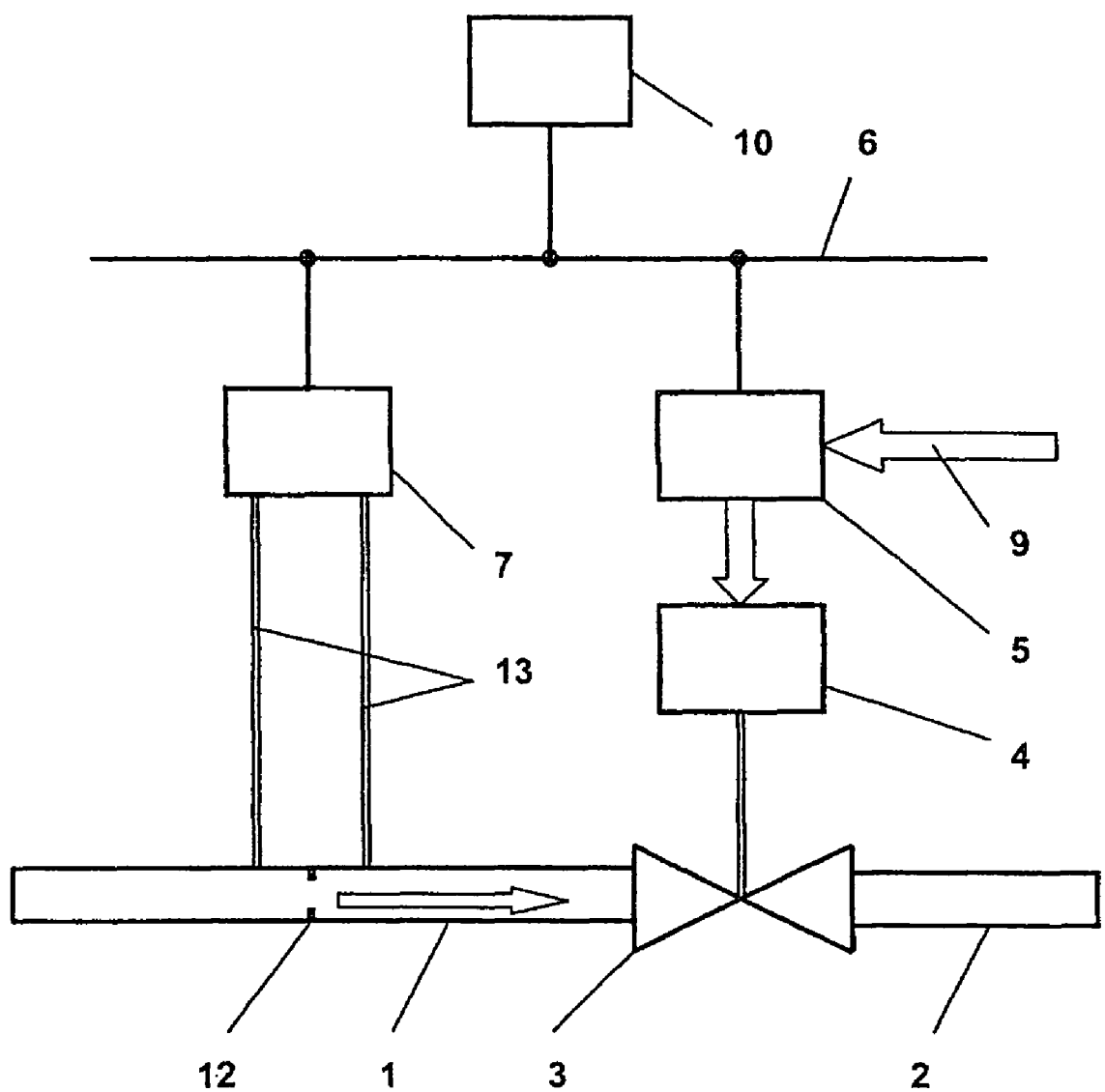
FIG. 2 shows a block diagram of an exemplary control circuit for controlling a process parameter with diagnostics.

FIG. 2 shows a block diagram of an exemplary control circuit for controlling a process parameter with diagnostics, in a further exemplary embodiment of the disclosure, where the same reference numbers are used for the same means. Unlike the diagram shown in FIG. 1, the actual-value encoder 7 is formed by a differential pressure transducer, which is connected to the container 1 by two control cables 13. An orifice 12 is provided in the container 1 between the connections of the control cables 13. The differential pressure in the container 1 before and after the orifice 12 is measured by the differential pressure transducer 7. The measured differential pressure is a measure of the volume flow rate through the orifice 12. The differential pressure transducer 7 is preferably fitted in the immediate vicinity of a process valve 3. How the control circuit works has already been described above.

For diagnostic purposes, the differential pressure transducer 7 internally evaluates the raw data from the pressure measurement and differential pressure measurement, in order to draw conclusions from this on the state of the process valve 3.

In addition, it can be provided to operate the differential pressure transducer 7 as a microphone in order to detect valve noise and/or process noise that propagates in the process medium.

The differential pressure transducer 7 sends the diagnostic data obtained to the control device 5. It can also be provided that the diagnostic data is transferred to the control system 10.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCES

1, 2 container
3 process valve
4 actuator
5 control device
6 fieldbus
7 actual-value encoder
8 sensor
9 pneumatic fluid supply
10 control system
11 direct connection
12 orifice
13 control cable

What is claimed is:

1. A control device for a pneumatically operated actuator for actuating a process valve in order to control a material flow in a pipeline, said control device comprising:
   a communications interface for receiving an electrical setpoint value, and varying at its output, the pressure of a pneumatic fluid as a function of a control deviation,
   wherein the received electrical setpoint value is suitable as a process parameter, and the control device including a second interface connected via a communications channel to an actual-value encoder, the second interface is for receiving an electrical signal output by the actual-value encoder corresponding to an actual value of the same process parameter, and for receiving diagnostic data from the actual-value encoder wherein the actual-value encoder evaluates the actual value of the process parameter to diagnose a condition of at least one of the process valve and the control device, and wherein the actual-value encoder is a differential pressure transducer which measures pressure and differential pressure and internally evaluates raw data to perform a diagnostic function of at least one of the process valve and the control device.

2. The control device as claimed in claim 1, wherein the actual-value encoder has a fieldbus interface, and is connected via this to a communications channel implemented as a fieldbus.

3. The control device as claimed in claim 1, wherein the actual-value encoder is connected via a direct connection to the control device.

4. The control device as claimed in claim 3, wherein the direct connection is formed by a wireless communications channel.

5. A control arrangement for a pneumatically operated actuator for actuating a process valve in order to control a material flow in a pipeline, the control arrangement comprising:

a control device having a communications interface for receiving an electrical setpoint value, and varying at its output the pressure of the pneumatic fluid as a function of a control deviation, the received electrical setpoint value being suitable as a process parameter;

and a second interface, an actual-value encoder connected via a communications channel to the second interface of the control device, the actual-value encoder being configured to output an electrical signal corresponding to the actual value of said process parameter, and to output diagnostic data wherein the actual-value encoder evaluates the actual value of the process parameter to diagnose a condition of at least one of the process valve and the control device, and wherein the actual- value encoder is a differential pressure transducer which measures pressure and differential pressure and internally evaluates raw data to perform a diagnostic function of at least one of the process valve and the control device.

6. The control device as claimed in claim 1, wherein the actual-value encoder is used as a microphone to detect at least one of valve noise and process noise in the process medium.

7. The control arrangement as claimed in claim 5, wherein the actual-value encoder is used as a microphone to detect at least one of valve noise and process noise in the process medium.

* * * * *